US009921381B2

(12) United States Patent
Sinkfield et al.

(10) Patent No.: US 9,921,381 B2
(45) Date of Patent: Mar. 20, 2018

(54) LOOSE-TUBE OPTICAL FIBER CABLES

(71) Applicant: OFS Fitel, LLC, Norcross, GA (US)

(72) Inventors: Diretress P Sinkfield, Fairburn, GA (US); Henson P Toland, Atlanta, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/407,289

(22) Filed: Jan. 17, 2017

(65) Prior Publication Data
US 2017/0219791 A1 Aug. 3, 2017

Related U.S. Application Data

(60) Provisional application No. 62/290,673, filed on Feb. 3, 2016.

(51) Int. Cl.
*G02B 6/44* (2006.01)
(52) U.S. Cl.
CPC ............. *G02B 6/443* (2013.01); *G02B 6/441* (2013.01); *G02B 6/4434* (2013.01); *G02B 6/4471* (2013.01)
(58) Field of Classification Search
CPC .... G02B 6/443; G02B 6/4434; G02B 6/4471; G02B 6/441
See application file for complete search history.

(56) References Cited

U.S. PATENT DOCUMENTS

| 4,770,489 | A | * | 9/1988 | Saito | G02B 6/4407 385/110 |
| 5,621,841 | A | * | 4/1997 | Field | G02B 6/4411 385/113 |
| 6,377,738 | B1 | * | 4/2002 | Anderson | G02B 6/4433 385/100 |
| 6,459,837 | B1 | * | 10/2002 | Fitz | G02B 6/4432 385/113 |
| 2003/0228116 | A1 | * | 12/2003 | Davis | G02B 6/4438 385/109 |
| 2008/0031580 | A1 | * | 2/2008 | Keller | G02B 6/4494 385/113 |
| 2008/0232749 | A1 | * | 9/2008 | Rosenquist | G02B 6/4411 385/112 |
| 2010/0092140 | A1 | * | 4/2010 | Overton | C03C 25/106 385/112 |
| 2015/0086168 | A1 | * | 3/2015 | Blazer | G02B 6/4413 385/102 |
| 2015/0177471 | A1 | * | 6/2015 | Bringuier | G02B 6/4494 385/103 |

(Continued)

*Primary Examiner* — Peter Radkowski
(74) *Attorney, Agent, or Firm* — Sam S. Han, Esq.

(57) ABSTRACT

An optical fiber cable comprising 200 micrometer (μm) optical fibers (fibers with an outer diameter of approximately 200 μm) that are located within buffer tubes. This permits fiber packing densities of 3.8 fibers/mm² or higher. The buffer tubes have wall thicknesses ($t_{buffer}$) between approximately 7.5 percent (7.5%) and approximately 30% of the buffer tube's outer diameter ($OD_{buffer}$), and a Young's modulus that is between approximately 750 mega-pascals (MPa) and 2,200 MPa, thereby providing the necessary structural integrity to resist kinking yet maintain flexibility.

20 Claims, 1 Drawing Sheet

(56) References Cited

U.S. PATENT DOCUMENTS

| | | | |
|---|---|---|---|
| 2015/0370023 A1* | 12/2015 | Baca | G02B 6/441 385/110 |
| 2015/0370024 A1* | 12/2015 | Williamson | C08L 23/12 385/110 |
| 2017/0126321 A1* | 5/2017 | Boxer | H04B 10/25753 |

* cited by examiner

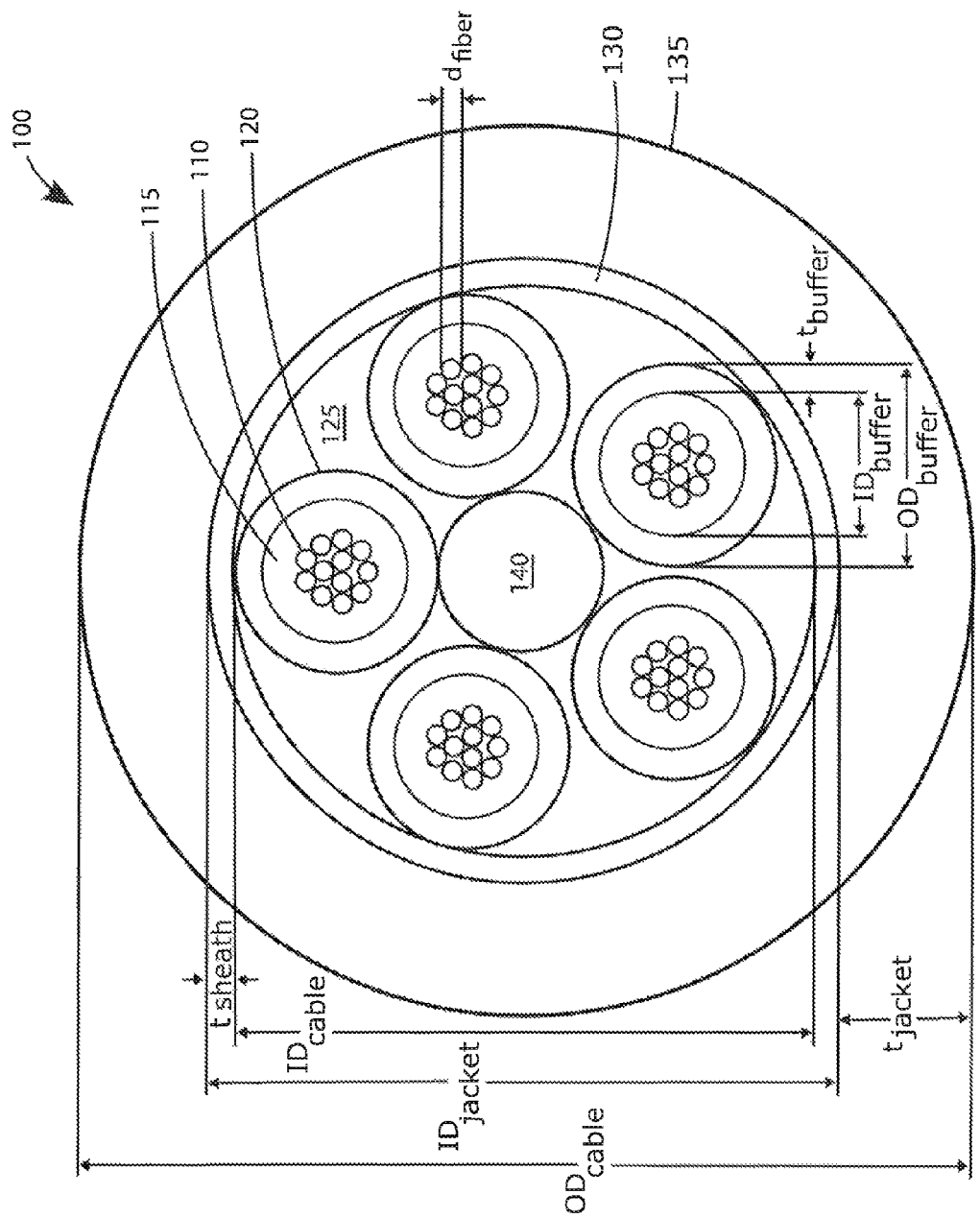

LOOSE-TUBE OPTICAL FIBER CABLES

CROSS REFERENCE TO RELATED APPLICATIONS

This application claims the benefit of U.S. provisional patent application Ser. No. 62/290,673, filed 2016 Feb. 3, by Sinkfield, et al, and having the title "High Fiber Density Loose Tube Optical Fiber Cables Incorporating Intermediate-Modulus Buffer Tubes and 200 Micron Optical Fiber," which is incorporated herein by reference in its entirety.

BACKGROUND

Field of the Disclosure

The present disclosure relates generally to cables and, more particularly, to optical fiber cables.

Description of Related Art

Often, it is necessary to access an optical fiber cable at various points along the optical fiber cable (also denoted as mid-span access) in order to provide service to the end-user or customer. Because of the work involved for mid-span access, there is an ongoing need for smaller and lighter cables that meet constraints that are imposed by cable standards (e.g., Telcordia GR-20-CORE, etc.), fiber standards (e.g., ITU-T G.657, etc.), or other well-known requirements in the industry.

Unfortunately, slight changes in fiber or cable design can result in unexpectedly large changes in actual performance, thereby causing unacceptable and unpredictable mismatches between theoretical designs and actual performance characteristics. Consequently, the task of manufacturing lighter and stronger cables is oftentimes non-trivial.

SUMMARY

The present disclosure provides several embodiments of optical fiber cables.

Briefly described, one embodiment of the system comprises a loose-tube optical fiber cable. The cable comprises 200 micrometer (μm) optical fibers (fibers with an outer diameter of approximately 200 μm) that are located within buffer tubes. This permits fiber packing densities of 3.8 fibers/mm² or higher. The buffer tubes have wall thicknesses ($t_{buffer}$) between approximately 7.5 percent (7.5%) and approximately 30% of the buffer tube's outer diameter ($OD_{buffer}$), and a Young's modulus that is between approximately 750 mega-pascals (MPa) and 2,200 MPa, thereby providing the necessary structural integrity to resist kinking yet maintain flexibility.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a diagram showing a cross-section of one embodiment of a loose-tube optical fiber cable.

DETAILED DESCRIPTION OF THE EMBODIMENTS

In recent years, increased demands for data have resulted in increased demands for optical fiber connectivity to customers (e.g., fiber-to-the-home, fiber-to-the-business, fiber-to-the-cell-tower-network, etc.). Often, mid-span access to optical fiber cables is necessary to provide fiber-optic services to the customer. The work involved for mid-span access includes removal of a cable sheath, exposure of optical fibers, connection of the optical fibers to drop cables or other subscriber cables, and sealing the cable in an optical enclosure to protect the access point from external elements. During mid-span access, care must be taken to prevent undesired tension in the relatively-fragile fibers. Typically, fiber tension is avoided by using a slack fiber, which is a length of fiber that is longer than the access point. For fusion splicing, the splice is contained within a protective sleeve that is mounted on a tray, with the slack fiber being stored in loose coils on mandrels that are designed in the tray.

Loose-tube cables are suitable for mid-span access because they organize the fibers into tubes with a relatively small number of fibers in each tube. This permits access to one or more fibers in one or two tubes without disturbing other tubes or fibers within the overall cable. When only a few tubes are accessed, other un-accessed tubes often have slack or excess lengths that are stored in relatively small, loose coils in the enclosure. For this reason, tubes made of flexible and kink-resistant materials (e.g., high-density polyethylene (HDPE), impact-modified polypropylene, blends of isotactic polypropylene with impact-modified polypropylene, or other polyolefins) are preferable.

Despite the efforts to protect optical fibers within the optical cables, all optical cables (e.g., aerial, underground, etc.) experience pulling, lashing, or plowing during installation, which results in attenuation of optical signals that are transmitted within the optical fibers. Furthermore, exposure to operating temperatures (between −40 Celsius (C) and +70 C) and aging further affect optical signal attenuation.

Some of these adverse effects can be ameliorated by using thicker buffer tubes, which provide better protection to the optical fibers from pulling, lashing, plowing, and even temperature effects. For example, the inner diameters of the buffer tubes can be reduced to increase the thickness of the buffer tubes. Unfortunately, reducing the inner diameter of the buffer tubes adversely affects signal attenuation, often to unacceptable levels. Also, thicker buffer tubes are less flexible and result in larger and heavier cables that have lower fiber densities per unit area.

On the other hand, in order to meet increased customer demands for fiber-optic connectivity, there is a preference for thinner buffer tubes that provide greater fiber densities. For example, the outer diameter of buffer tubes can be decreased to permit more buffer tubes within the same overall cable diameter and, thus, higher fiber densities. Unfortunately, increasing the outer diameter of the buffer tubes results in thinner wall thicknesses that correspond to greater vulnerability to crushing and kinking of the buffer tubes.

Because the factors that improve fiber density are in conflict with the factors that improve fiber protection, it is difficult and sometimes non-intuitive to determine how one factor affects another. For example, using thinner walls creates a stiffer buffer tube with a higher modulus of elasticity (e.g., by using a polybutylene terephthalate (PBT) material), but such thinner and stiffer buffer tubes are more prone to kinking and become difficult to handle in smaller enclosures. Additionally, many different variables contribute to the structural integrity of the buffer tubes, such as the specific polymer process, the tube outer diameter, etc. Furthermore, making slight alterations in fiber or cable designs are neither trivial nor intuitive because slight changes in fiber or cable designs can result in unexpectedly large changes in actual performance, thereby causing unacceptable and unpredictable mismatches between theoretical designs and actual performance characteristics.

Consequently, there are ongoing developments for smaller and lighter cables that meet constraints that are imposed by cable standards (e.g., Telcordia GR-20-CORE, etc.), fiber standards (e.g., ITU-T G.657, etc.), or other well-known requirements in the industry. This disclosure provides a higher-density loose-tube optical fiber cable that strikes an acceptable balance.

The current disclosure balances the need for higher packing densities without sacrificing structural integrity of an optical fiber cable by using 200 micrometer (μm) optical fibers (fibers with an outer diameter of approximately 200 μm). This permits fiber packing densities of 3.8 fibers/mm$^2$ or higher. The cable comprises a wall thickness ($t_{buffer}$) that is between approximately 7.5 percent (7.5%) and approximately 30% of the outer diameter ($OD_{buffer}$), and a Young's modulus that is between approximately 750 mega-pascals (MPa) and 2,200 MPa, thereby providing the necessary structural integrity to resist kinking yet maintain flexibility. By using 200 μm optical fibers and smaller buffer tubes, higher fiber packing densities can be achieved while concurrently maintaining the necessary structural integrity for mid-span access cables.

Having provided a general solution, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing a cross-section of one embodiment of a loose-tube optical fiber cable 100. To be clear, although the layout of FIG. 1 may appear similar to conventional loose-tube cables, the inventive aspects of the cable 100 are found in the dimensions and material properties of the cable 100.

As shown in FIG. 1, the cable 100 comprises twelve (12) 200 μm optical fibers 110 in buffer tubes 120. The 200 μm optical fibers 110 have an outer diameter ($d_{fiber}$) of approximately 200 μm, which permits a packing density that is greater than 3.8 fibers/mm$^2$ in each buffer tube 120. Preferably, the 200 μm optical fibers comply with industry requirements, such as ITU-T G.657 standards. Although twelve (12) optical fibers 110 are shown in the buffer tube 120, along with gel or other fillers 115, it should be appreciated that the number of optical fibers 110 and the dimensions of the buffer tube 120 can both be varied, as explained in greater detail below.

In the embodiment of FIG. 1, each buffer tube 120 has a Young's modulus that is between approximately 750 megapascals (MPa) and 2,200 MPa, along with an outer diameter ($OD_{buffer}$) that is approximately 2.0 mm. Because the $OD_{buffer}$ is smaller than conventional buffer tubes for 250 μm optical fibers, the reduced dimensions of the buffer tubes result in correspondingly smaller dimensions for the other internal components of the cable 100, thereby allowing for more compact cable designs. In order to maintain a Young's modulus within its operating requirements, the buffer tube 120 comprises a flexible and kink-resistant polymer, such as high-density polyethylene, impact-modified polypropylene, isotactic polypropylene, thermoplastic polyurethane, another type of polyolefin, or any combination thereof.

Preferably, the buffer tube 120 has an inner diameter ($ID_{buffer}$) that is between approximately 1.3 mm and approximately 1.4 mm, which translates to a wall thickness ($t_{buffer}$) that is between approximately 0.3 mm and approximately 0.35 mm, or between 15% and 17.5% of $OD_{buffer}$. However, it should be appreciated that the $ID_{buffer}$ can range from as low as 0.15 mm to as high as 0.6 mm, and $t_{buffer}$ can range from as low as 7.5% to as high as 30%, while maintaining structural integrity of the buffer tube. For example, for $OD_{buffer}$ of 2 mm, $ID_{buffer}$ can be 0.8 mm, 1.1 mm, 1.2 mm, 1.3 mm, 1.4 mm, or 1.7 mm, which translates to $t_{buffer}$ being 0.6 mm (30% of $OD_{buffer}$), 0.45 mm (22.5% of $OD_{buffer}$), 0.4 mm (20% of $OD_{buffer}$), 0.35 mm (17.5% of $OD_{buffer}$), 0.3 mm (15% of $OD_{buffer}$), or 0.15 mm (7.5% of $OD_{buffer}$), respectively. Those having skill in the art will appreciate that these numerical values are provided to more clearly illustrate different embodiments of the cable 100 and, thus, the numerical values represent the upper and lower limits of the dimensions of the buffer tube 120 for different embodiments.

Continuing with FIG. 1, the cable 100 further comprises a central strength member 140 that is aligned with the buffer tubes 120, thereby providing structural strength to the cable 100. The cable 100 further comprises a wrapping 130 (or sheath) surrounding the central strength member 140 and the buffer tubes 120, with filler material 125 (e.g., a water blocking compound, waterswellable yarns, etc.) located in the interstitial spaces between the buffer tubes 120. An outer jacket 135, which is located radially exterior to the buffer tubes 120 and the strength member 140, protects all of the internal components (e.g., optical fibers 110, buffer tubes 120, strength member 140, filler 125, wrapper 130, etc.) of the cable 100.

The preferred embodiments of the cables, as shown and described with reference to FIG. 1, comply with industry cabling standards, such as the Telcordia GR-20-CORE requirements for outside plant cables. For example, 200 μm optical fibers with a fiber packing density of at least 3.8 fibers/mm$^2$ in polypropylene buffer tubes with $OD_{buffer}$ of 2.0 mm and $ID_{buffer}$ of 1.3 mm to 1.4 mm (one embodiment of the cable 100 of FIG. 1) must also pass: (a) temperature cycling tests (withstanding temperatures ranging from −40 degrees Celsius (C) to +70 C); (b) cable aging tests; (c) bend tests (e.g., four (4) complete wraps on a mandrel that is less than 20 times (20×) the outer diameter of the cable ($OD_{jacket}$)); (d) impact tests (withstanding impacts of four (4) Newton-meters (N-m) of energy); (e) tensile tests (withstanding loads ranging from 800N to 2700N); (f) compressive loading tests (incidental loads ranging from 110N/cm to 220N/cm for designated time periods); (g) cable twist tests (withstanding repeated 180 degree twists in both clockwise and counterclockwise directions); (h) cable flex tests (withstanding repeated flex cycles on 20× $OD_{jacket}$ mandrel). For most of these tests, the GR-20-CORE standard requires the maximum change in fiber attenuation to be less than 0.15 decibels per kilometer (dB/km) for singlemode fibers at 1550 nm or less than 0.4 dB/km for multimode fibers at 1300 nm. Insofar as those having skill in the art are familiar with the GR-20-CORE standard, the ITU-T G.657 standard, and various other standards that govern the performance of optical fibers and cables, further discussion of these standards is omitted here. However, it should be noted that the embodiments shown and described with reference to FIG. 1 (using 200 µm optical fibers and smaller buffer tubes) either meet or exceed the outside plant cable requirements as set forth in the various industry standards while achieving higher fiber packing densities.

Although an example embodiment has been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A loose-tube optical fiber cable, comprising:
   buffer tubes, each buffer tube comprising:
      an outer diameter ($OD_{buffer}$) of approximately two (2) millimeters (mm);
      an inner diameter ($ID_{buffer}$) between approximately 0.8 mm and approximately 1.7 mm;
      a wall thickness ($t_{buffer}$) between approximately 0.15 mm and approximately 0.6 mm; and
      a Young's modulus between approximately 750 mega-pascals (MPa) and 2,200 MPa;
   optical fibers located within the buffer tubes, each optical fiber comprising an outer diameter ($d_{fiber}$) of approximately 200 micrometers (µm), the optical fibers having a fiber packing density that is at least approximately 3.8 fibers/mm$^2$;
   a strength member aligned with the buffer tubes; and
   an outer jacket located radially exterior to the buffer tubes and the strength member.

2. The cable of claim 1, wherein:
   $t_{buffer}$ is further between approximately 0.3 mm and approximately 0.45 mm, and
   $ID_{buffer}$ is further between approximately 1.1 mm and approximately 1.4 mm.

3. The cable of claim 1, wherein:
   $t_{buffer}$ is further between approximately 0.3 mm and approximately 0.4 mm, and
   $ID_{buffer}$ is further between approximately 1.2 mm and approximately 1.4 mm.

4. The cable of claim 1, wherein:
   $t_{buffer}$ is further between approximately 0.3 mm and approximately 0.35 mm, and
   $ID_{buffer}$ is further between approximately 1.3 mm and approximately 1.4 mm.

5. The cable of claim 1, the buffer tubes comprising a material selected from the group consisting of:
   high-density polyethylene;
   impact-modified polypropylene;
   isotactic polypropylene;
   thermoplastic polyurethane;
   polyolefin; and
   any combination thereof.

6. An optical fiber cable, comprising:
   a buffer tube comprising an outer diameter ($OD_{buffer}$), the buffer tube further comprising a wall thickness ($t_{buffer}$), $t_{buffer}$ being at least 7.5 percent (%) of $OD_{buffer}$, $t_{buffer}$ further being at most 30% of $OD_{buffer}$, the buffer tube further comprising a Young's modulus between approximately 750 mega-pascals (MPa) and 2,200 MPa;
   optical fibers located within the buffer tube, the optical fibers having an outer diameter ($d_{fiber}$) of approximately 200 micrometers (µm), the optical fibers having a fiber packing density of at least 3.8 fibers/mm$^2$.

7. The cable of claim 6, $t_{buffer}$ t further being between at least 15% of $OD_{buffer}$ and 22.5% of $OD_{buffer}$.

8. The cable of claim 6, $t_{buffer}$ t further being between at least 15% of $OD_{buffer}$ and 20% of $OD_{buffer}$.

9. The cable of claim 6, $t_{buffer}$ t further being between at least 15% of $OD_{buffer}$ and 17.5% of $OD_{buffer}$.

10. The cable of claim 6, $OD_{buffer}$ being approximately 2.0 mm.

11. The cable of claim 10, the buffer tube comprising an inner diameter ($ID_{buffer}$), the inner diameter having a lower limit and an upper limit, the lower limit of $ID_{buffer}$ being one selected from the group consisting of:
   approximately 0.8 mm;
   approximately 1.1 mm;
   approximately 1.2 mm; and
   approximately 1.3 mm.

12. The cable of claim 10, the buffer tube comprising an inner diameter ($ID_{buffer}$), the inner diameter having a lower limit and an upper limit, the upper limit of $ID_{buffer}$ being one selected from the group consisting of:
   approximately 1.2 mm;
   approximately 1.3 mm;
   approximately 1.4 mm; and
   approximately 1.7 mm.

13. The cable of claim 6, the buffer tubes comprising a material selected from the group consisting of:
   high-density polyethylene;
   impact-modified polypropylene;
   isotactic polypropylene;
   polybutylene terephthalate;
   polyolefin; and
   any combination thereof.

14. An optical fiber cable, comprising:
   a buffer tube comprising an outer diameter ($OD_{buffer}$) of approximately 2.0 millimeters (mm), the buffer tube further comprising a wall thickness ($t_{buffer}$) between approximately 0.15 mm and approximately 0.60 mm, the buffer tube further comprising a Young's modulus between approximately 750 mega-pascals (MPa) and 2,200 MPa; and
   optical fibers located within the buffer tube, the optical fibers having an outer diameter ($d_{fiber}$) of approximately 200 micrometers (µm), the optical fibers having a fiber packing density of at least 3.8 fibers/mm$^2$.

15. The cable of claim 14, $t_{buffer}$ further being between a lower limit and an upper limit, the lower limit of $t_{buffer}$ being one selected from the group consisting of:
   approximately 0.3 mm;
   approximately 0.35 mm;
   approximately 0.4 mm; and
   approximately 0.45 mm.

16. The cable of claim 14, $t_{buffer}$ further being between a lower limit and an upper limit, the upper limit of $t_{buffer}$ being one selected from the group consisting of:
   approximately 0.35 mm;
   approximately 0.4 mm;
   approximately 0.45 mm; and
   approximately 0.6 mm.

17. The cable of claim 14, the buffer tube comprising an inner diameter ($ID_{buffer}$), the inner diameter having a lower limit and an upper limit, the lower limit of $ID_{buffer}$ being one selected from the group consisting of:
   approximately 0.8 mm;
   approximately 1.1 mm;
   approximately 1.2 mm; and
   approximately 1.3 mm.

18. The cable of claim 14, the buffer tube comprising an inner diameter ($ID_{buffer}$), the inner diameter having a lower limit and an upper limit, the upper limit of $ID_{buffer}$ being one selected from the group consisting of:
- approximately 1.2 mm;
- approximately 1.3 mm;
- approximately 1.4 mm; and
- approximately 1.7 mm.

19. The cable of claim 14, the buffer tubes comprising a material selected from the group consisting of:
- high-density polyethylene;
- impact-modified polypropylene;
- isotactic polypropylene;
- thermoplastic polyurethane;
- polyolefin; and
- any combination thereof.

20. The cable of claim 14, further comprising additional buffer tubes, each buffer tube comprising twelve (12) 200 μm optical fibers.

* * * * *